US007724237B2

(12) United States Patent
Combs et al.

(10) Patent No.: US 7,724,237 B2

(45) Date of Patent: May 25, 2010

(54) HANDHELD PRINTING DEVICES AND SYSTEMS ADAPTED TO RECEIVE RADIO SIGNAL INFORMATION INDICATIVE OF A POSITION AND METHODS FOR USING THE SAME

(75) Inventors: James Lee Combs, Lexington, KY (US); William Henry Reed, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 1038 days.

(21) Appl. No.: 11/382,297

(22) Filed: May 9, 2006

(65) Prior Publication Data

US 2007/0264069 A1 Nov. 15, 2007

(51) Int. Cl.
*G06F 3/033* (2006.01)
*G09G 5/08* (2006.01)

(52) U.S. Cl. ....................... 345/158; 345/157; 345/169; 347/50; 455/13.3; 358/1.15

(58) Field of Classification Search ................ 358/1.15; 347/50; 455/13.3; 345/157, 158, 169
See application file for complete search history.

(56) References Cited

U.S. PATENT DOCUMENTS

| | | | | |
|---|---|---|---|---|
| 6,302,527 | B1 * | 10/2001 | Walker | 347/50 |
| 6,628,430 | B1 * | 9/2003 | Silverbrook et al. | 358/473 |
| 6,738,044 | B2 * | 5/2004 | Holzrichter et al. | 345/158 |
| 2007/0047012 | A1 * | 3/2007 | Bryant | 358/403 |

* cited by examiner

*Primary Examiner*—Benny Q Tieu
*Assistant Examiner*—Quyen Ngo

(57) ABSTRACT

Hand-held printing device and systems adapted to receive radio signal information indicative of a position. Hand-held printing device having at least one antenna and a controller adapted to calculate the relative position of the hand-held printing device by comparing received radio signals on the antennae. Methods for using the same.

10 Claims, 5 Drawing Sheets

HANDHELD PRINTING DEVICES AND SYSTEMS ADAPTED TO RECEIVE RADIO SIGNAL INFORMATION INDICATIVE OF A POSITION AND METHODS FOR USING THE SAME

TECHNICAL FIELD OF THE INVENTION

The present invention is directed to a hand-held printing device, and more specifically to a unique hand-held printing device and systems adapted to receive radio signal information indicative of a position and methods of using the same.

BACKGROUND OF THE INVENTION

One feature of a hand-held printer is the random motion printing as compared to a conventional linear-type printer. Most digital printers operate by moving paper under the printing element. This is true for "page printers" which have an active print zone extending across the full width of the paper and true for "serial printers" that also move the print element across the page width in addition to moving the length of the paper by the printing element. This relative movement of paper and print element is a traditional configuration for digital printers. An alternative approach is to fix the position of the paper while the printer element is moved over the paper during printing. An example of this alternative approach is a flat bed plotter where the movement of the print element is controlled by fixed mechanical references along and outside the paper edges. The printer of the present invention is moved manually over the surface of the paper without mechanical linkage and without mechanical control form a fixed reference point. This category of printers is sometimes called a "hand printer" or "random motion printer." One advantage of this type of category is printer is the potential for compact size which makes it attractive for mobile printing operations.

Because of the effect on resulting print quality, a significant factor in printer design is the accuracy of positioning the print element relative to the page during the printing process. To increase accuracy, position sensors are often adopted to "close the loop" and confirm location. Such sensors typically detect rotation of paper feed rolls or lateral travel of the carrier for the print element. Without precise sensing, small errors can accumulate until the print quality is degraded to an unacceptable level. As such, for a random motion printer it is desired to have an improved ability to determine the position of the print element relative to the paper. Prior hand-held printers in the art have utilized one or more optical sensors to detect typographic structure on paper similar to an optical mouse pointing device. However, such designs can require expensive optical elements and may not always produce reliable results. As such, there is a need for new methods of determining position of the print element relative to the paper. Accordingly, improved hand-held printing devices, systems and methods for using the same are desired.

SUMMARY OF THE INVENTION

The present invention relates to a hand-held printing device that is adapted to receive radio signal information indicative of relative position of the printing device on the print media. One aspect of the present invention is a method of using a radio signal to identify a location of a hand-held printing device on the print media. The method comprises receiving a radio signal on a first antenna of the printing device; receiving the radio signal on a second antenna on the printing device; and calculating a current location of the printing device utilizing the received radio signals.

Another aspect of the present invention is a hand-held printing device. The hand-held printing device is adapted to receive radio signal information indicative of a position. The hand-held device comprises at least one antenna configured to receive a radio signal; a printhead; and a controller in communication with the antenna and the printhead, wherein the controller is adapted to calculate a relative position of a hand-held printing device by comparing received radio signals of the antenna.

Yet another aspect of the present invention is the hand-held printer system. The hand-held printer system comprises a base unit comprising a radio signal transmitter; a hand-held printing device; and a host device, wherein the host device is in communication with a hand-held printing device and the base unit. The hand-held printing device comprises: a printhead, at least one antenna configured to receive a radio signal and a controller wherein the controller is in communication with the antenna and the printhead and herein the controller is adapted to calculate a relative position of a hand-held printing device by comparing received radio signals from the base unit.

The hand-held printers of the present invention and methods for using the same are advantageous for identifying a location of a hand-held printing device on a print media. These and additional advantages will be apparent in view of the detailed description.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

Figure 1:
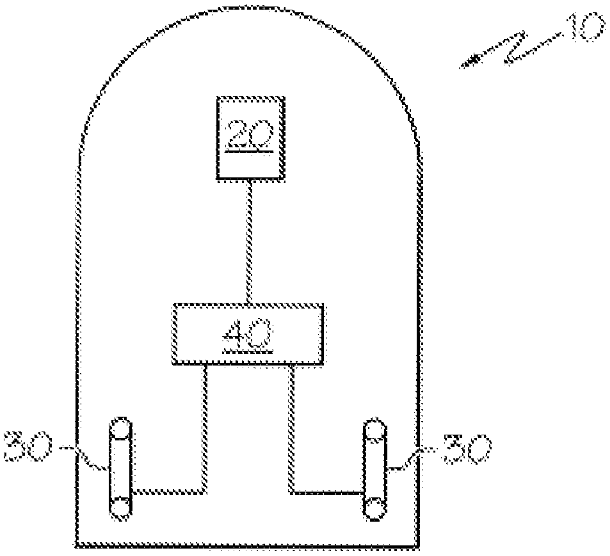
FIG. 1 is a schematic illustration of an exemplary hand-held printer according to a first embodiment of the present invention.

The embodiments set forth in the drawings are illustrative in nature and not intended to be limiting of the invention defined by the claims. Moreover, the individual features of the drawings and the invention will be more fully apparent and understood in view of the detailed description.

DETAILED DESCRIPTION OF THE INVENTION

Reference will now be made in detail to various embodiments which are illustrated in the accompanying drawings, wherein like numerals indicate similar elements throughout the views.

One embodiment of the present invention, a hand-held printing apparatus, is illustrated in FIG. 1. In this embodiment, the hand-held printer 10 comprises a printhead 20, one or more antenna 30, and a controller 40. The antennas are configured to receive a radio signal. The controller 40 is in communication with the antenna 30 and the printhead 20. The controller 40 is adapted to calculate a relative position of the hand-held printing device 10 by comparing received radio signals on the antenna 30.

The radio signal may be sent from an external device such as a fixed base portion which serves as a beacon. In one exemplary embodiment, the radio signal is a high-frequency radio signal, such as 5 GHz. The printing unit is moved by hand over the print media and the print media remains in a set position and does not move relative to the external beacon until the end of the printing process.

In one exemplary embodiment, the hand-held printer device 10 has two or more antenna 30 which communicate with the external radio beacon. In this embodiment, calculation of rotation of the printing device 10 can be performed in the event that the printing device utilizes a line of print points, for example, an inkjet printhead comprised of an array of ink nozzles. Because it can be assumed that the target print surface is two dimensional and normal orientation can be logically assumed to be an operational requirement, only two antennas are required. But as one of ordinary skill will appreciate, a hand-held printing device with more than two antennas could provide increased resolution or provide redundancy.

In another exemplary embodiment, the radio beacon is comprised as a base unit. The base unit may incorporate a docking station for the printing device for maintenance, protection and/or reloading data or supplies. In another exemplary embodiment, the base unit is in communication with a host computer or mobile information device (such as a personal digital assistant, digital camera, MP3 player or mobile phone). The communication link may be a wireless or wired link. Exemplary wireless links include Bluetooth, IR and the like. In one embodiment, print jobs are sent from the host computer or a mobile information device to the base unit and then on to the printing unit. In one exemplary embodiment, the print information can be processed either on the host device, the base unit or the printing unit. Similarly, the calculation of position based on the radio signals of the present invention can be performed in any of these three components. In one exemplary embodiment, the calculation of position based on the radio signals takes placed on the controller 40 of the hand-held printer. Calculation of position by controller 40 can minimize any communication delays inherent in transmitting the data to the host computer/mobile information device or base station.

Figure 2:
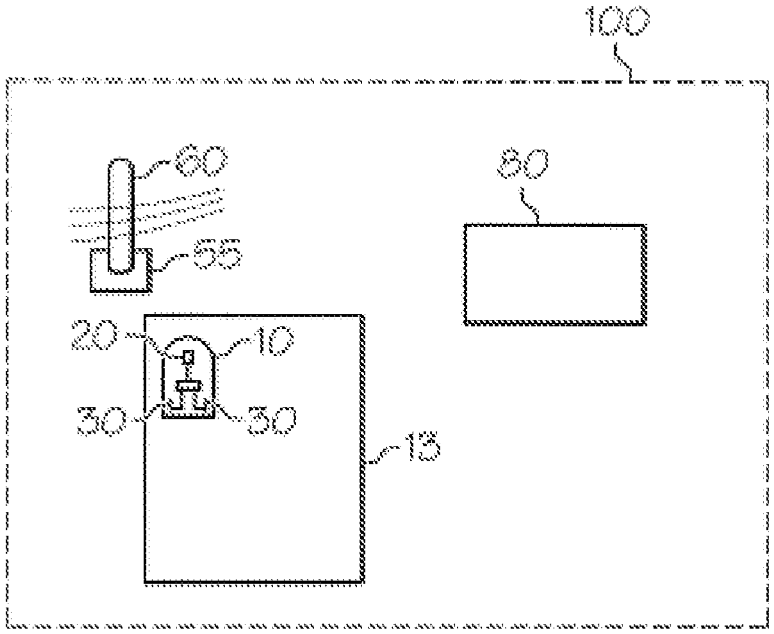
FIG. 2 is a schematic illustration of an exemplary hand-held printer system according to a second embodiment of the present invention.

Another embodiment of the present invention is illustrated in FIG. 2. In this embodiment, a hand-held printer system 100 comprises a base unit 55, a hand-held printing device 10 and a host device 80. The base unit 55 comprises a radio signal transmitter 60. In one exemplary embodiment, the radio signal transmitter is adapted to transmit high frequency radio signals, such as 5 GHz. The hand-held printing device 10 comprises a printhead 20, and at least one antenna 30 configured to receive the radio signal from the base unit radio signal transmitter 60. In one exemplary embodiment, the hand-held printing device 10 further comprises a controller, wherein the controller is in communication with the antenna and the printhead and wherein the controller is adapted to calculate a relative position of the hand-held printing device by comparing received radio signals form the base unit. In another exemplary embodiment, the controller is located in the base unit 55. In yet another exemplary embodiment, the controller is located in the host device 80.

Figure 3:
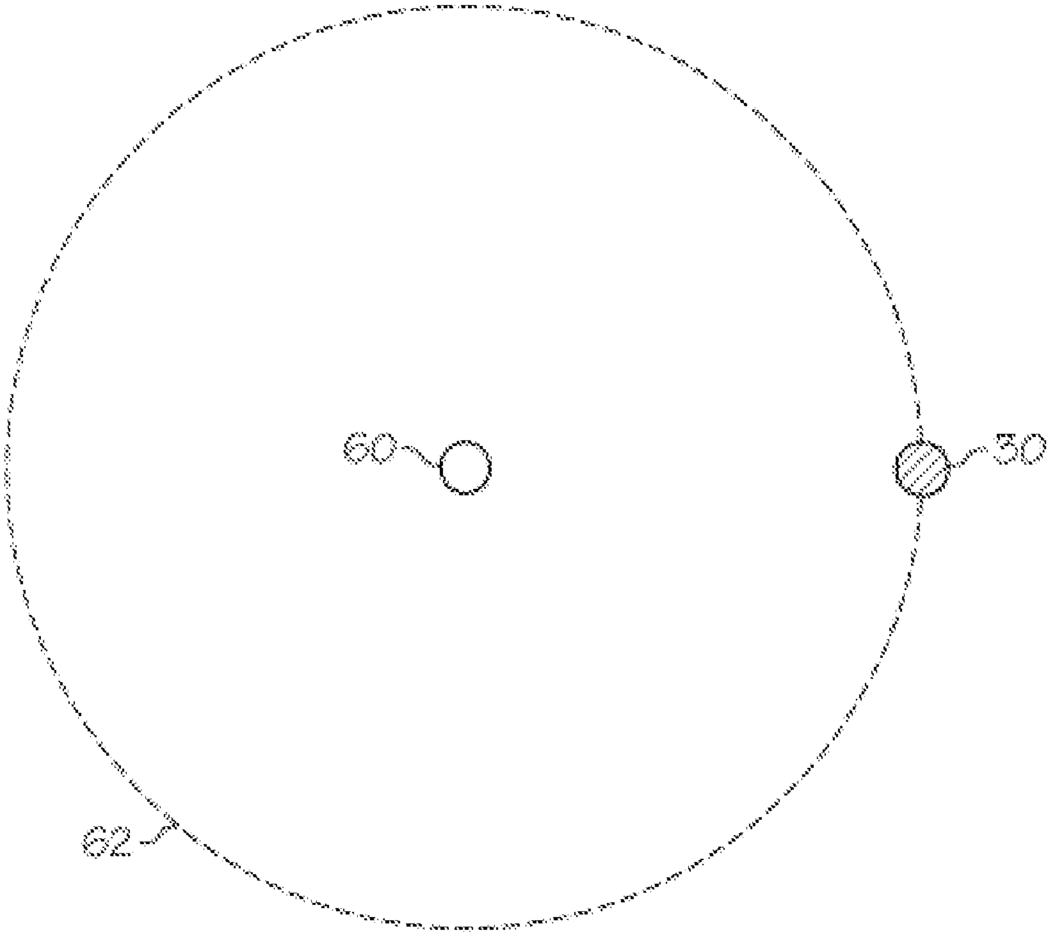
FIG. 3 is a schematic of a radio signal propagating away from a transmitter and received at a printer antenna.
Figure 4:
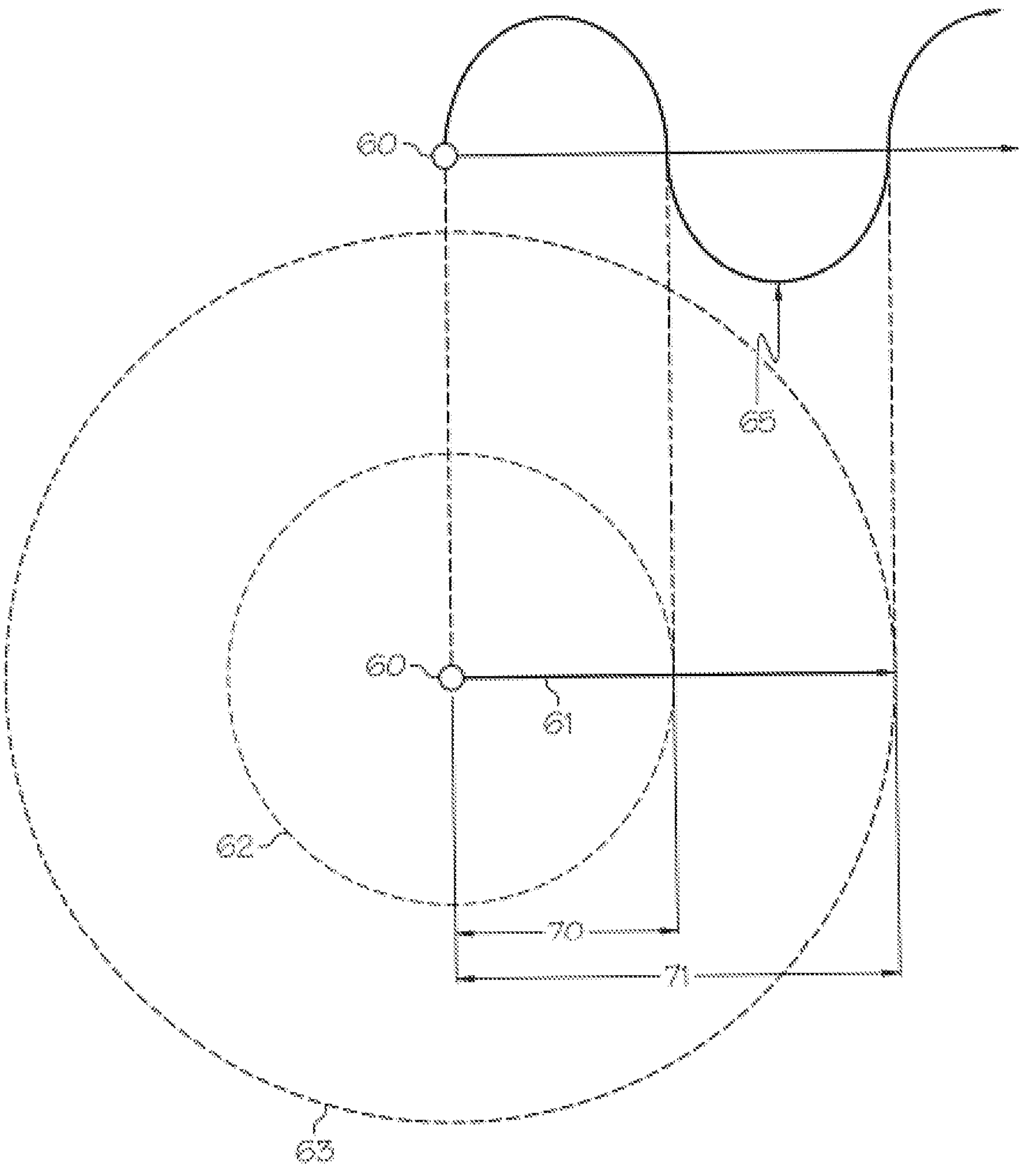
FIG. 4 is a schematic illustrating a plurality of locations characterized by a zero-crossing frequency.

FIG. 3 illustrates how during printing, the radio signal transmitter 60 transmits a signal 62 that changes frequency predictably over a range of frequencies sufficient that any point on the target paper will be exposed to both a maximum and minimum resonating signal. In one exemplary embodiment, this corresponds to about one-quarter of the wavelength of the beacon, for maximum at peak to no signal at the "zero-crossing" point, the frequency at which no signal is detected at the antenna 30. For every point on the target paper, a specific zero-crossing frequency ($f_0$) can be determined. FIG. 4 illustrates how a radio signal with wave pattern 65 produces zero-crossing at multiple positions including 70 and 71 as well as similar other positions on the page illustrated by the signals 62 and 63.

Figure 5:
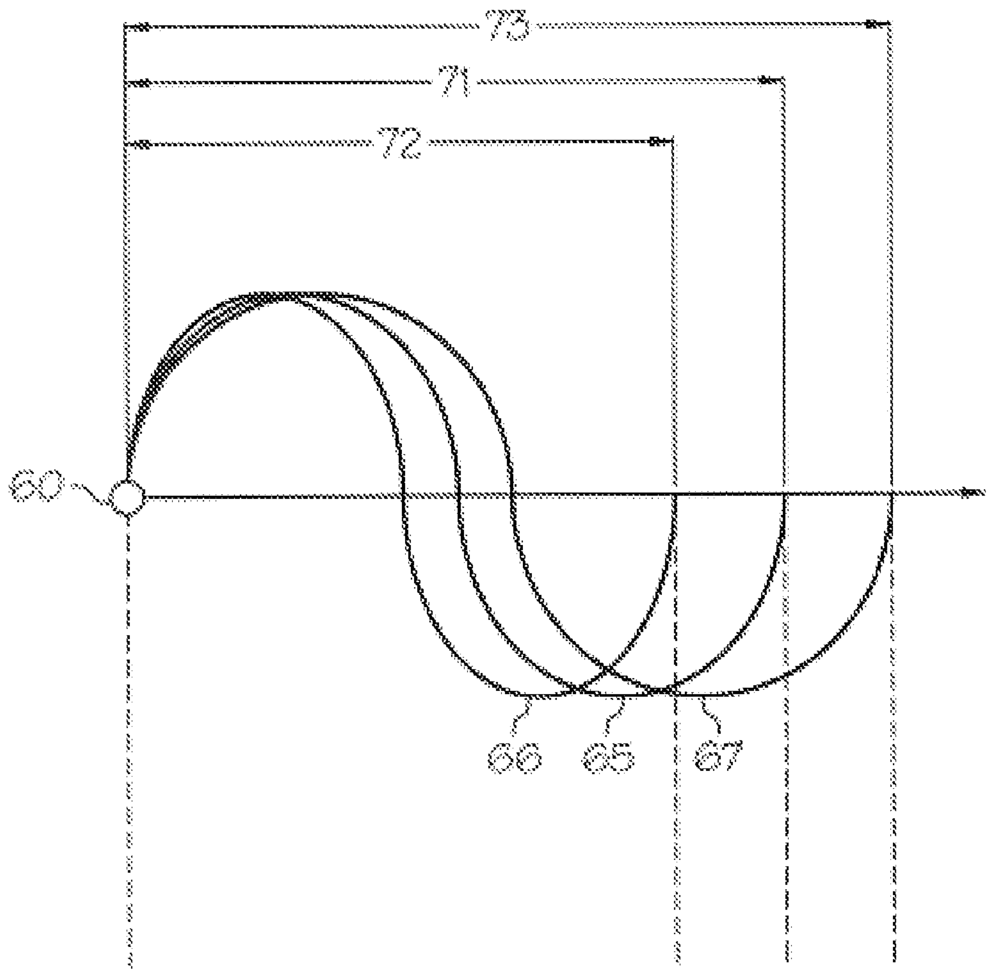
FIG. 5 is a schematic illustrating how motion changes a zero-crossing frequency.

One of ordinary skill will appreciate that a moving target will have a different $f_0$ value for each position over the paper as illustrated in FIG. 5. Moving from an initial position 71 to a position closer to the beacon 72 will increase $f_0$ while moving to a position further from the beacon 73 will decrease $f_0$. The wave patterns 65, 66, and 67 correspond to zero-crossing frequencies for the three such positions. In an exemplary embodiment, the controller periodically analyzes the radio signal to determine $f_0$ at the current position of the printer.

At the zero-crossing frequency, the distance between signal transmitter and receiving antenna will be an integer multiple of half-wavelengths. The distance value cannot be calculated from a single determination of $f_0$, but the change in distance may be calculated from two zero-crossing frequencies, provided the target does not change position between two samples by more than a quarter-wavelength.

Figure 6:
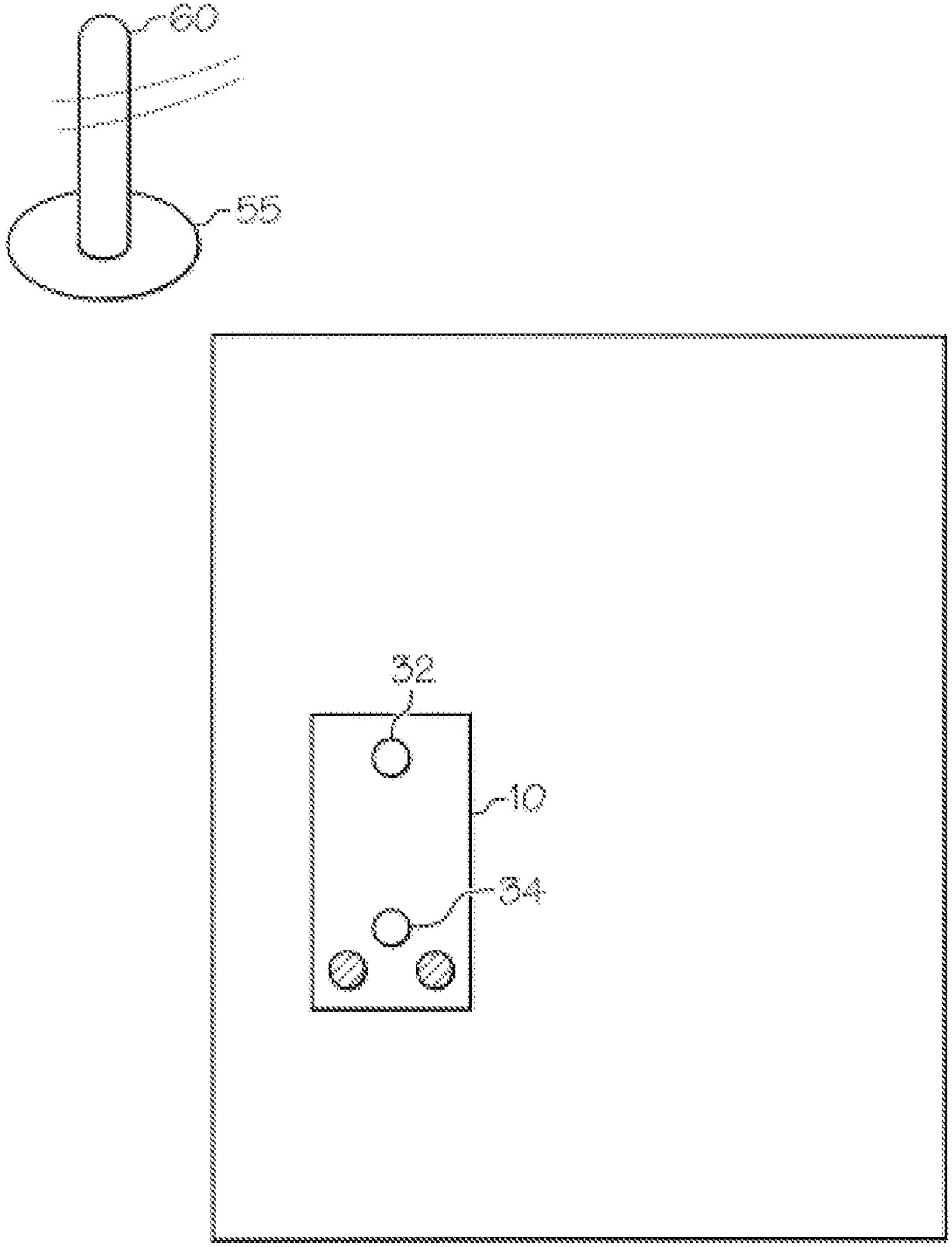
FIG. 6 is a schematic illustration of an exemplary hand-held printer system according to a third embodiment of the present invention.

One exemplary embodiment of the present invention, a hand-held printing system, is illustrated in FIG. 6. In this embodiment, it is not required to know the absolute distance from the printing unit antennae 32 and 34 to the beacon 60, because all that is required is the relative motion of the unit from the last position. The hand-held printer 10 is assumed to start printing in one position on the paper, for example, the upper left, and all further printing on the page is calculated relative to that starting point. In this embodiment, the distance between the two antennae 32 and 34 is fixed and known. As such, utilizing the radio signal transmitted by the beacon 60 and being received by the antennae 32 and 34, the relative position of the hand-held printer 10 can be calculated.

The present invention differs from most RF based inertial measuring systems. Global positioning systems (GPS) use a reference signal transmitted on a carrier to allow the receivers to synchronize to the transmitter and determine the transmit time of the beacon. GPS is an absolute position measuring system, whereas the present invention is a relative measuring motion system.

By using short distances, the radiated power can be kept low enough to allow extended sue on batteries or low power sources in the radio signal transmitter 60. In one exemplary embodiment, the antenna receiver 30 is located in the hand-held printing unit 10. In another exemplary embodiment, dual radio signal transmitters 60 and receivers can be utilized to provide a more accurate x/y Cartesian based referencing system from the polar based radio transmitter beacons.

One exemplary embodiment of the present invention is a method of using a radio signal to identify a location of a hand-held printing device on a print media. The method comprises receiving a first radio signal on a first antenna of a printing device, wherein the first radio signal comprises a varying frequency signal transmitted by a beacon; receiving the first radio signal on a second antenna of the printing device; determining a first zero-crossing frequency ($f_0$) corresponding to the received radio signal at the first antenna; determining a second zero-crossing frequency corresponding to the received second radio signal at the second antenna; and calculating the relative change in location of the printing device utilizing the determined first zero-crossing frequency and the second zero-crossing frequency. In one exemplary embodiment, the controller comprises a readable memory unit, wherein the memory unit is configured to store at least one set of previous zero-crossing frequencies. As such, by comparing the present first and second zero-crossing frequencies with one or more sets stored in memory for prior calculations, the controller can determine the relative position of the print unit as compared to the stored sets of data in the memory unit using the method described above.

One exemplary embodiment of the present invention comprises a base until which incorporates a docking station for the printing portion. The docking station can be configured to provide maintenance, protection, recharging, reloading data or supplies to the hand-held printing device. In one exemplary embodiment, the base station is in communication with the computer or mobile information device. In this embodiment, a print job can be sent from the computer to the base station to the hand-held printer.

In another embodiment of the present invention, the base unit may comprise an antenna on the host computer or mobile information device with the antenna being integrated or optionally attached as an adapter. In this embodiment, the radio transmitter is integrated or connected to the host device or mobile information device. For example, the base unit may comprise a USB-type connector and plug into the host device. As noted above, the host device may comprise a mobile information device such as a PDA, personal information device, MP3 player or mobile telephone.

The foregoing description of the various embodiments and principles of the invention has been presented for the purposes of illustration and description. It is not intended to be exhaustive or to limit the invention to the precise forms disclosed. Many alternatives, modifications and variations will be apparent to those skilled in the art. For example, some principles of the invention may be used in different hand-held devices other than hand-held printers. For example, hand-held scanners, mouse location devices and the such. Moreover, although multiple inventive concepts have been presented, such aspects need not be utilized in combination, and various combinations of the inventive aspects are possible in light of the various embodiments provided above. Accordingly, the above description is intended to embrace all possible alternatives, modifications, combinations, and variations that have been discussed or suggested herein, as well as others that fall within the principles, spirit and broad scope of the invention as defined by the claims.

We claim:

1. A method of using a radio signal to identify a location of a hand-held printing device on a print media, comprising:

receiving a first radio signal on a first antenna of the printing device, wherein the first radio signal comprises a varying frequency signal transmitted by a beacon;

receiving a second radio signal on a second antenna of the printing device, wherein the second radio signal comprises a varying frequency signal transmitted by the beacon;

determining a first zero-crossing frequency corresponding to the received first radio signal at a first time;

determining a second zero-crossing frequency corresponding to the received second radio signal at a first time;

receiving the first radio signal on the first antenna at a second time;

determining a first zero-crossing frequency corresponding to the received first radio signal at the second time;

receiving the second radio signal on the second antenna at a second time;

determining a second zero-crossing frequency corresponding to the received second radio signal at the second time; and calculating a relative change in location of the printing device utilizing the determined first zero-crossing frequency and the second zero-crossing frequency at both the first and second times.

2. A hand-held printing system, comprising:

a base unit comprising a radio signal transmitter; and a hand-held printing device, wherein the hand-held printing device comprises:

a printhead, at least two antennas configured to receive one or more radio signals from the base unit, and a controller wherein the controller is in communication with the antennas and the printhead and wherein the controller is adapted to:

determine a first zero-crossing frequency corresponding to a received first radio signal at a first time;

determine a second zero-crossing frequency corresponding to a received second radio signal at the first time;

determine a first zero-crossing frequency corresponding to the received first radio signal at a second time;

determine a second zero-crossing frequency corresponding to the received second radio signal at the second time; and calculate a relative position of the hand-held printing device by comparing the determined first zero-crossing frequency and the second zero-crossing frequency at both the first and second times.

3. The hand-held printing system of claim 2, further comprising a host device, wherein the host device is in communication with the hand-held printing device and the base unit.

4. The hand-held printing system of claim 3, wherein the base unit is attached to the host device.

5. The hand-held printing system of claim 2, wherein the base unit further comprises a docking station adapted for the hand-held printing device.

6. The hand-held printing system of claim 3, wherein the host device comprises a mobile information device.

7. The hand-held printing system of claim 3, wherein the host device comprises a personal computer.

8. The system of claim 2, further comprising a second radio signal transmitter.

9. The system of claim 2, wherein the base unit is configured to transmit a signal comprising a predetermined range of frequencies.

10. The system of claim 2, wherein the controller is adapted to calculate a zero-crossing frequency utilizing corresponding to a current location of the hand-held printing device.

* * * * *